US010105762B2

(12) United States Patent
Hecht et al.

(10) Patent No.: US 10,105,762 B2
(45) Date of Patent: Oct. 23, 2018

(54) CUTTING TOOL KEY, CUTTING HEAD KEY ASSEMBLY AND METHOD OF ATTACHING CUTTING HEAD TO TOOL HOLDER

(71) Applicant: Iscar, Ltd., Tefen (IL)

(72) Inventors: Gil Hecht, Nahariya (IL); David Ben Harouche, Nahariya (IL)

(73) Assignee: Iscar, Ltd., Tefen (IL)

( * ) Notice: Subject to any disclaimer, the term of this patent is extended or adjusted under 35 U.S.C. 154(b) by 307 days.

(21) Appl. No.: 15/049,683

(22) Filed: Feb. 22, 2016

(65) Prior Publication Data

US 2017/0239734 A1   Aug. 24, 2017

(51) Int. Cl.
*B23B 51/02* (2006.01)
*B25B 13/48* (2006.01)

(52) U.S. Cl.
CPC .............. *B23B 51/02* (2013.01); *B25B 13/48* (2013.01); *B23B 2251/02* (2013.01); *B23B 2260/078* (2013.01)

(58) Field of Classification Search
CPC .............. B23B 51/02; B23B 2260/078; B23B 2251/02
See application file for complete search history.

(56) References Cited

U.S. PATENT DOCUMENTS

5,957,631 A    9/1999  Hecht
D591,140 S     4/2009  Schafer et al.

*Primary Examiner* — Moshe Wilensky
(74) *Attorney, Agent, or Firm* — Womble Bond Dickinson (US) LLP (57) ABSTRACT

A cutting tool key includes a handle component, for actuating rotation of the cutting tool key and a locking member that is attached to the handle component. The locking member includes a head receptacle portion at a rear end thereof and a sleeve member attached to the locking member. The sleeve member is elastically flexible and circumferentially surrounds the head receptacle portion. A cutting head key assembly includes a cutting head that is located at the head receptacle portion and elastically clamped thereat by the sleeve member. The cutting head key is rotated to releasably attach the cutting head to the tool holder.

26 Claims, 5 Drawing Sheets

CUTTING TOOL KEY, CUTTING HEAD KEY ASSEMBLY AND METHOD OF ATTACHING CUTTING HEAD TO TOOL HOLDER

FIELD OF THE INVENTION

The present invention relates to rotary cutting tools, in which a cutting head is releasably attached in a tool holder, in general, and to a cutting tool key for mounting and extracting the cutting head into and out of such a tool holder, in particular.

BACKGROUND OF THE INVENTION

Rotary cutting tools, for example drilling tools, can be modular where a cutting head can be releasably attached to a tool holder. In order to attach the cutting head to the tool holder, a cutting tool key can be used to rotate the cutting head relative to the tool holder about a key central axis, by applying a locking torque at key grip surfaces located on the cutting head.

The key grip surfaces can be formed in the vicinity of rake surfaces located on cutting arms of the cutting head. An example of a cutting tool key suitable for actuating rotation of the cutting head at such key grip surfaces is disclosed in U.S. Pat. No. 5,957,631 (see FIG. 15).

Alternatively the key grip surfaces can be formed in notches located at forward peripheral portions on the cutting arms of the cutting head. An example of a cutting tool key suitable for actuating rotation of the cutting head at such key grip surfaces is disclosed in U.S. D591,140.

It is an object of the subject matter of the present application to provide an improved novel cutting tool key.

It is another object of the subject matter of the present application to provide a cutting tool key that allows the cutting head to be easily releasably attached to the tool holder, even for relatively small cutting heads, where the diameter of the cutting head, as measured with respect to its axis of rotation, can be in the range of 4 mm to 5.99 mm.

It is yet another object of the subject matter of the present application to provide a cutting head key assembly having the cutting head elastically clamped to cutting tool key prior to assembly of the rotary cutting tool.

SUMMARY OF THE INVENTION

In accordance with a first aspect of the subject matter of the present application there is provided a cutting tool key, having a key central axis about which the cutting tool key is rotatable in a rotational locking direction, the key central axis extending in a forward to rearward direction, the cutting tool key comprising:
 a handle component, for actuating rotation of the cutting tool key about the key central axis;
 a locking member attached to the handle component and extending therefrom in the rearward direction along the key central axis, the locking member comprising a head receptacle portion at a rear end thereof, for receipt of a cutting head; and
  a sleeve member attached to the locking member; wherein the sleeve member is elastically flexible and circumferentially surrounds the head receptacle portion.

In accordance with a further aspect of the subject matter of the present application, there is also provided a cutting head key assembly comprising:
 a cutting head; and
 the aforementioned cutting tool key; wherein
 the cutting head key assembly is adjustable between an assembled and unassembled position; and
 in the assembled position, the cutting head is mated to the head receptacle portion and elastically clamped by the sleeve member.

In accordance with yet a further aspect of the subject matter of the present application, there is also provided a method of releasably attaching a cutting head belonging to an assembled cutting head key assembly, to a tool holder to define a fastened position of a rotary cutting tool; wherein
 the cutting head has a head central axis extending in a forward to rearward direction and about which the cutting head is rotatable in a rotational direction, the cutting head comprising a plurality of cutting arms extending radially outwards with respect to the head central axis, each cutting arm comprising a rotationally arm leading and trailing surfaces, facing away from each other in opposite directions, and an arm peripheral surface extending peripherally therebetween, and at least one head latch; and
 the tool holder has a holder longitudinal axis, extending in the forward to rearward direction and about which the tool holder is rotatable in the rotational direction, the tool holder comprising:
  a holder peripheral surface extending circumferentially along the holder longitudinal axis and forming a boundary of a holder base surface at a forward end of the tool holder;
  a plurality of circumferentially spaced apart driving members extending forwardly from the holder base surface; and
  at least one holder undercut for receipt of a respective head latch, to prevent axial separation of the cutting head from the tool holder; wherein
 the method comprises the steps of:
 positioning the cutting head key assembly relative to the tool holder so that the cutting head is adjacent the forward end of the tool holder and each cutting arm is angularly offset from a respective pair of adjacent driving members;
 displacing the cutting head key assembly towards the tool holder until the cutting head engages the tool holder and each cutting arm is located angularly between the respective pair of adjacent driving members;
 rotating the cutting head key in the rotational locking direction until resistive contact between the cutting arms and the driving members prevents further rotation of the cutting tool key and each head latch is located at a respective holder undercut; and withdrawing the cutting tool key away from the rotary cutting tool.

In accordance with still yet a further aspect of the subject matter of the present application, there is also provided a method of releasably attaching a cutting head having a head central axis to a tool holder having a holder longitudinal axis, the cutting head being attached to a cutting tool key by a flexible sleeve member which is mounted on the cutting tool key and has an sleeve inner surface in frictional engagement with the cutting head, the method comprising:
 positioning the cutting tool key with the attached cutting head, adjacent a forward end of the tool holder;
 displacing the cutting tool key in a direction towards the tool holder such that a portion of said forward end is received into the flexible sleeve member, and the cutting head engages the forward end of the tool holder;
 rotating the cutting tool key until the cutting head is fastened to the tool holder; and displacing the cutting tool key in a direction away from the tool holder, until said portion of said forward end is no longer received into the flexible sleeve member.

It is understood that the above-said is a summary, and that features described hereinafter may be applicable in any combination to the subject matter of the present application, for example, any of the following features may be applicable to the cutting tool key, the cutting head key assembly or the method of releasably attaching the cutting head to the tool holder:

The sleeve member can comprise a sleeve through cavity, peripherally delimited by a sleeve inner surface, the sleeve through cavity opening out at least to a rearward sleeve opening. The sleeve inner surface can comprise a guiding surface extending from the rearward sleeve opening towards the head receptacle portion.

The sleeve through cavity can have a cylindrical shape when the sleeve member is unflexed.

The sleeve member can be made of silicone.

The sleeve member has a modulus of elasticity (E). The modulus of elasticity can be in the range $0.001\ GPa \leq E \leq 0.05\ GPa$.

The sleeve member can be transparent or translucent.

The locking member can be attached to the handle component at a forward end of the locking member.

The handle component and locking member may be integrally formed together to have unitary one-piece construction.

The locking member can comprise a circumferential locking member peripheral surface extending along the key central axis in the rear direction from the handle component. The sleeve member can be releasably and elastically attached at a sleeve mounting portion located on the locking member peripheral surface.

The sleeve mounting portion can comprise a conical surface that tapers radially inwardly towards the key central axis in the rearward direction.

The sleeve mounting portion can comprise a first cylindrical surface having a first cylinder diameter.

The sleeve mounting portion can further comprise a second cylindrical surface having a second cylinder diameter and being located forward of the first cylindrical surface. The second cylinder diameter can be larger than the first cylinder diameter.

The locking member peripheral surface can comprise an axial stop surface that faces generally in the rearward direction. The sleeve member can be in contact with the axial stop surface.

The handle component can exhibit N-fold rotational symmetry about the key central axis, where N is an integer.

The handle component can comprise a handle top surface, a handle bottom surface and a handle peripheral surface extending therebetween. The handle top surface and the handle bottom surface can be planar and perpendicular to the key central axis.

The locking member can project in the rearward direction from a radially central portion of the handle bottom surface.

The cutting tool key can further comprise an extraction through hole extending between, and opening out to, the handle top surface and head receptacle portion.

The cutting head can comprise a head coupling portion that includes a head coupling pin protruding rearwardly from a head rear surface. The head coupling pin can extend through and beyond the rearward sleeve opening in the rearward direction.

The cutting head can have a head central axis extending in a forward to rearward direction and about which the cutting head is rotatable in a rotational direction, the cutting head can comprise a plurality of cutting arms extending radially outwards with respect to the head central axis, each cutting arm can comprise opposing arm rotationally leading and trailing surfaces, and an arm peripheral surface extending peripherally therebetween. The arm peripheral surfaces can define a cutting head diameter. The sleeve member can comprise a sleeve through cavity which opens out at least to a rearward sleeve opening, the sleeve through cavity being peripherally delimited by a sleeve inner surface and having a sleeve diameter when the sleeve is unflexed and in the unassembled position of the cutting head key assembly: the cutting head is unattached to the cutting tool key; and the cutting head diameter is greater than the sleeve diameter.

The sleeve inner surface can comprise a guiding surface extending from the rearward sleeve opening towards the head receptacle portion.

The cutting head can comprise a head coupling portion that includes a head coupling pin protruding rearwardly from a head rear surface. In the assembled position, the head coupling pin can extend through and beyond the rearward sleeve opening in the rearward direction.

The method can further comprise, before the step of positioning the cutting head key assembly relative to the tool holder, the steps of: positioning the forward end of the tool holder at the rearward sleeve opening, and sliding the guiding surface along the holder peripheral surface in the rearward direction.

The method can further comprise the step of: inserting the head coupling pin into the holder coupling hole before the guiding surface slides along the holder peripheral surface in the rearward direction.

The method can further comprising the step of sliding the sleeve inner surface along a holder peripheral surface of the tool holder, after the step of displacing the cutting tool key in a direction towards the tool holder.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
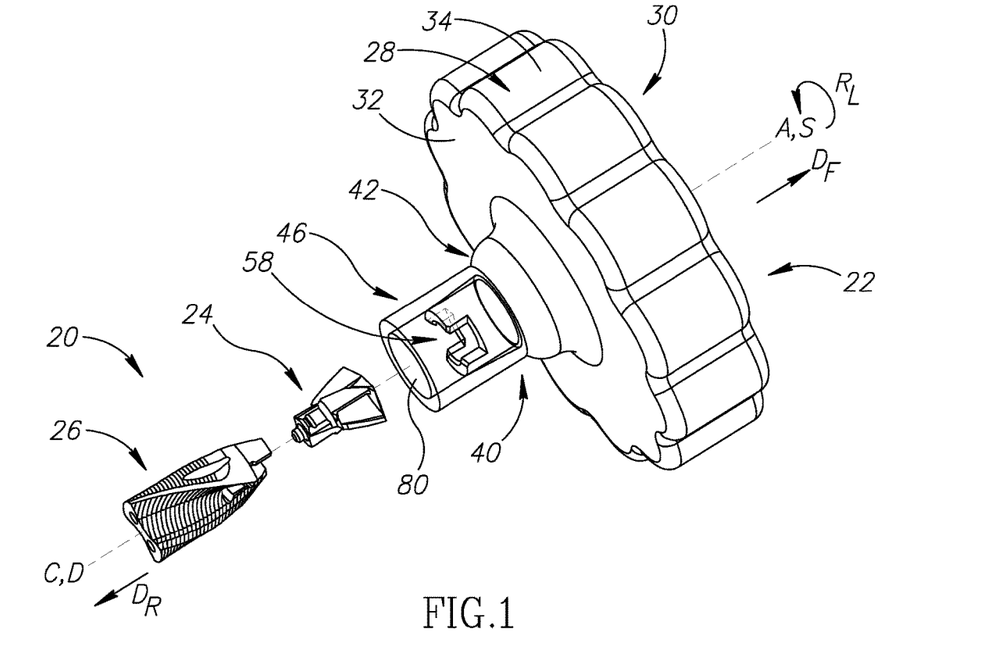
FIG. 1 is a perspective view of a cutting tool key, in accordance with a first embodiment of the present application, with a rotary cutting tool in a released position.

Attention is first drawn to FIG. 1 showing a rotary cutting tool 20, of the type used for drilling operations, in a released position, and a cutting tool key 22, 122 in accordance with embodiments of the subject matter of the present application. The rotary cutting tool 20 has a cutting head 24 which can be typically made from cemented carbide. The rotary cutting tool 20 also has a tool holder 26, complementary to the cutting head 24, which can be typically made from steel. The rotary cutting tool 20 is adjustable between a released position and a fastened position. In the fastened position of the rotary cutting tool 20, the cutting head 24 is releasably attached in the tool holder 26.

One aspect of the subject matter of the present application relates to a cutting tool key 22, 122. The purpose of the cutting tool key 22, 122 is for assembling the rotary cutting tool 20. Specifically, the cutting tool key 22, 122 is intended to rotate the cutting head 24 relative to the tool holder 26 so that the cutting head 24 is releasably attached to the tool holder 26, i.e. the fastened position of the rotary cutting tool 20.

Figure 2:
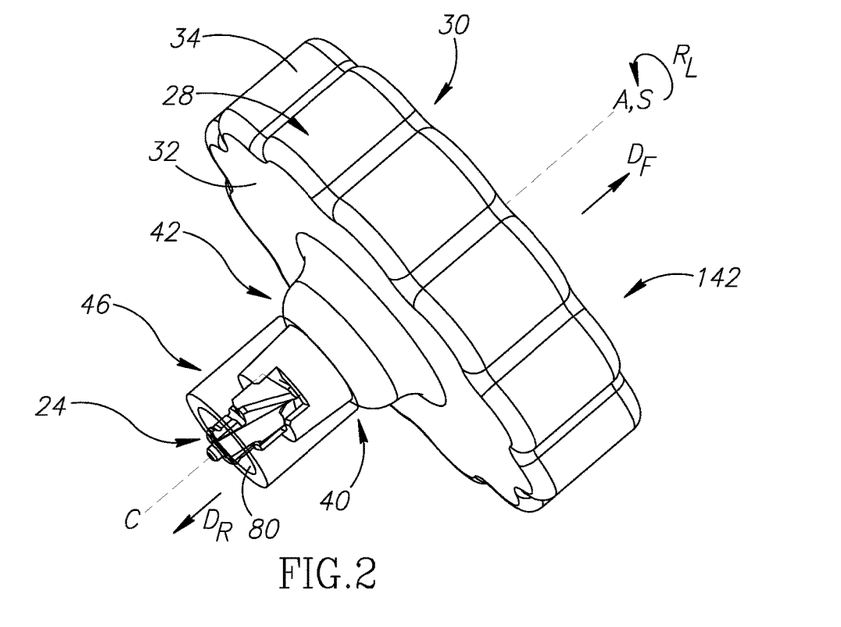
FIG. 2 is a perspective view of a cutting head key assembly.
Figure 3:
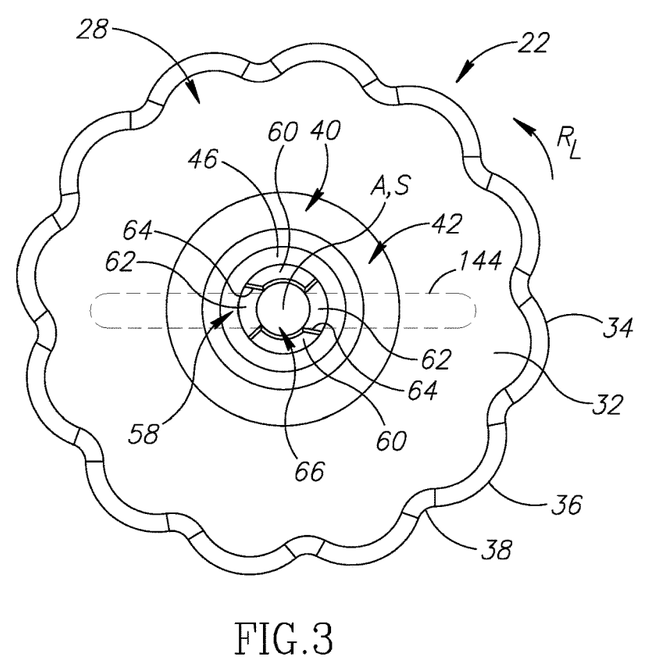
FIG. 3 is an end view of the cutting head key assembly shown in FIG. 2.
Figure 4:
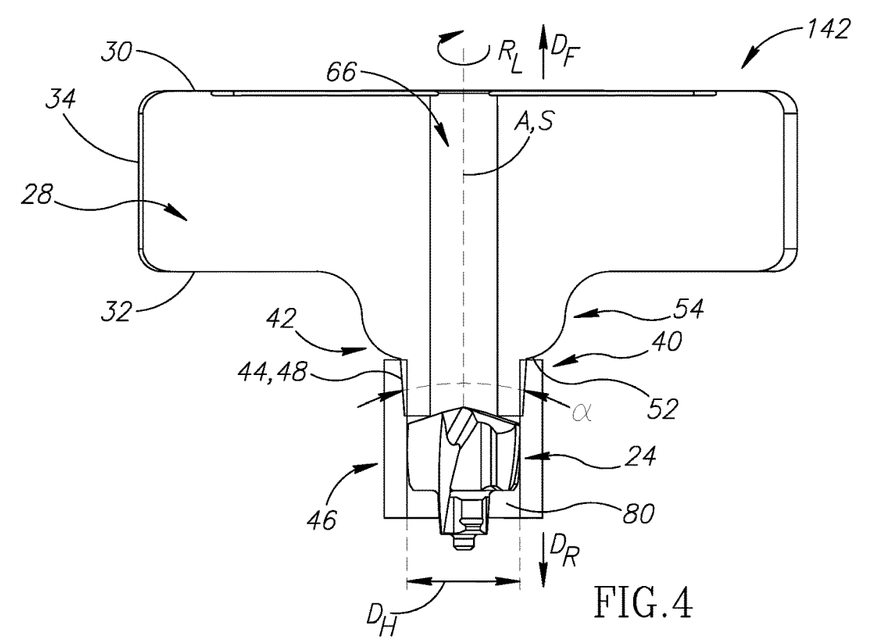
FIG. 4 is a cross-sectional view of the cutting head key assembly shown in FIG. 2.
Figure 5:
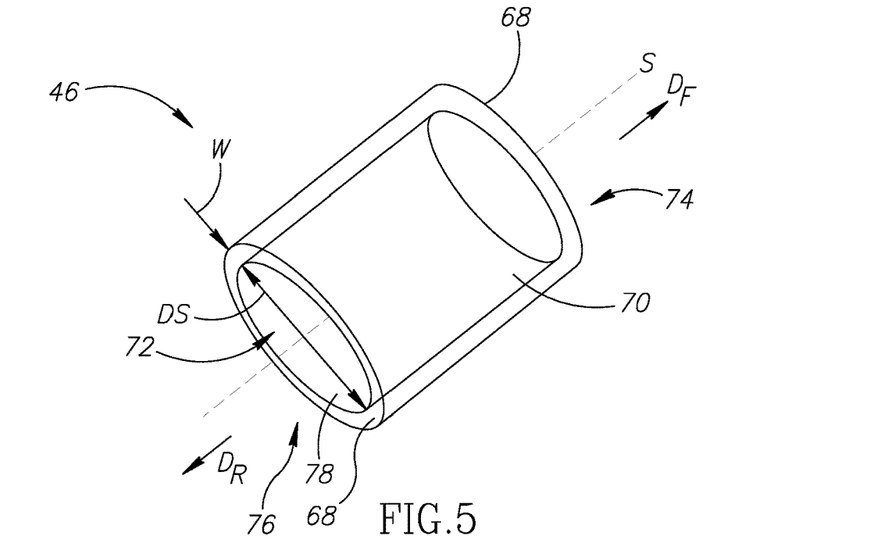
FIG. 5 is a perspective view of a sleeve member shown in FIG. 1.

Referring to FIGS. 2 to 4, the cutting tool key 22, 122 includes a key central axis A about which the cutting tool key 22, 122 is rotatable in a rotational locking direction $R_L$. The key central axis A extends in a forward $D_F$ to rearward direction $D_R$. In accordance with some embodiments of the subject matter of the present application the key central axis A can be a longitudinal axis. It should be understood that use of the terms "forward" and "rearward" throughout the description and claims refer to a relative position in the direction of the key central axis A towards the up and down directions, respectively, in FIG. 4.

The cutting tool key 22, 122 includes a handle component 28. The handle component 28 is used to actuate the rotation of the cutting tool key 22, 122 about the key central axis A in the rotational locking direction $R_L$. In accordance with some embodiments of the subject matter of the present application, the handle component 28 can be made from a plastic, such as polypropylene reinforced with 10% Glass Fiber, or a similar material. The handle component 28 can include a handle top surface 30, a handle bottom surface 32 and a handle peripheral surface 34 that extends between the handle top surface 30 and the handle bottom surface 32. As seen in FIG. 3, the handle peripheral surface 34 can include a plurality of radially convexly curved portions 36 and a plurality of radially concavely curved portions 38. Each radially convexly curved portion 36 can be interposed between two adjacent radially concavely curved portions 38. Thus, as seen in an end view of the cutting tool key 22, 122 (i.e. FIG. 3) the handle peripheral surface 34 alternatingly increases and decreases in distance from the key central axis A as it extends in the rotational locking direction $R_L$. The handle component 28 can exhibit N-fold rotational symmetry about the key central axis A, where N is an integer. Preferably, the handle component 28 can exhibit 12-fold rotational symmetry about the key central axis A. Advantageously, such a configuration provides a suitable shape for an operator to grasp, when actuating rotation of the cutting tool key 22, 122 in the rotational locking direction $R_L$. As shown in FIG. 4, the handle top surface 30 and the handle bottom surface 32 can be planar and extend transversely to the key central axis A. Preferably, the handle top surface 30 and a handle bottom surface 32 can be perpendicular to the key central axis A.

The cutting tool key 22, 122 includes a locking member 40. The locking member 40 is attached to the handle component 28. The locking member 40 extends from the handle component in a rearward direction $D_R$ along the key central axis A. In accordance with some embodiments of the subject matter of the present application a forward end of the locking member 40 can be attached to the handle component 28. The locking member 40 can be integrally attached to the handle component 28. That is to say, the locking member 40 and the handle component 28 are of unitary one-piece construction and are thus made from the same material. Advantageously, when such a material is a plastic, for example, the cutting regions of the cutting head 24 are not damaged if they come into contact with any portion of the locking member 40. Moreover, by virtue of such a one-piece construction the possibility of the locking member 40 breaking from the handle component 28 is reduced. Further moreover, manufacture of the cutting tool key 22, 122 is made easier since no attachment process (of the handle component 28 to the locking member 40) is required.

As seen in FIGS. 1 to 2, and FIG. 4, in accordance with some embodiments of the subject matter of the present application the locking member 40 can include a circumferential locking member peripheral surface 42 that extends along the key central axis A in the rearward direction $D_R$ from the handle component 28. Preferably, the locking member 40 can project in the rearward direction $D_R$ from a radially central portion of the handle bottom surface 32. The locking member peripheral surface 42 can include a sleeve mounting portion 44. The sleeve mounting portion 44 is designed for attaching a sleeve member 46 thereto.

As seen best in FIG. 4, in accordance with some embodiments of the subject matter of the present application the sleeve mounting portion 44 of the cutting tool key 22 can include a conical surface 48. The conical surface 48 can taper radially inwardly towards the key central axis A in the rearward direction $D_R$. The conical surface 48 defines a cone angle $\alpha$. The cone angle $\alpha$ can be in the range $3° \leq \alpha \leq 5°$. Preferably cone angle $\alpha$ can be equal to 4°. Alternatively, as seen in the non-limiting example shown in FIG. 6, in accordance with some other embodiments of the subject matter of the present application, the sleeve mounting portion 44 of the cutting tool key 122 can include a first cylindrical surface 50a that has a first cylinder diameter D1. Additionally, the locking member peripheral surface 42 can include a second cylindrical surface 50b having a second cylinder diameter D2. The second cylindrical surface 50b can be located forward of the first cylindrical surface 50a. The second cylinder diameter D2 is larger than the first cylinder diameter D1. In such a way, the locking member peripheral surface 42 can include a plurality of cylindrical surfaces 50a, 50b, each having a diameter that is larger than that of the cylindrical surface 50a, 50b located rearwardly adjacent thereto, thereby forming a stepped peripheral surface.

Figure 6:
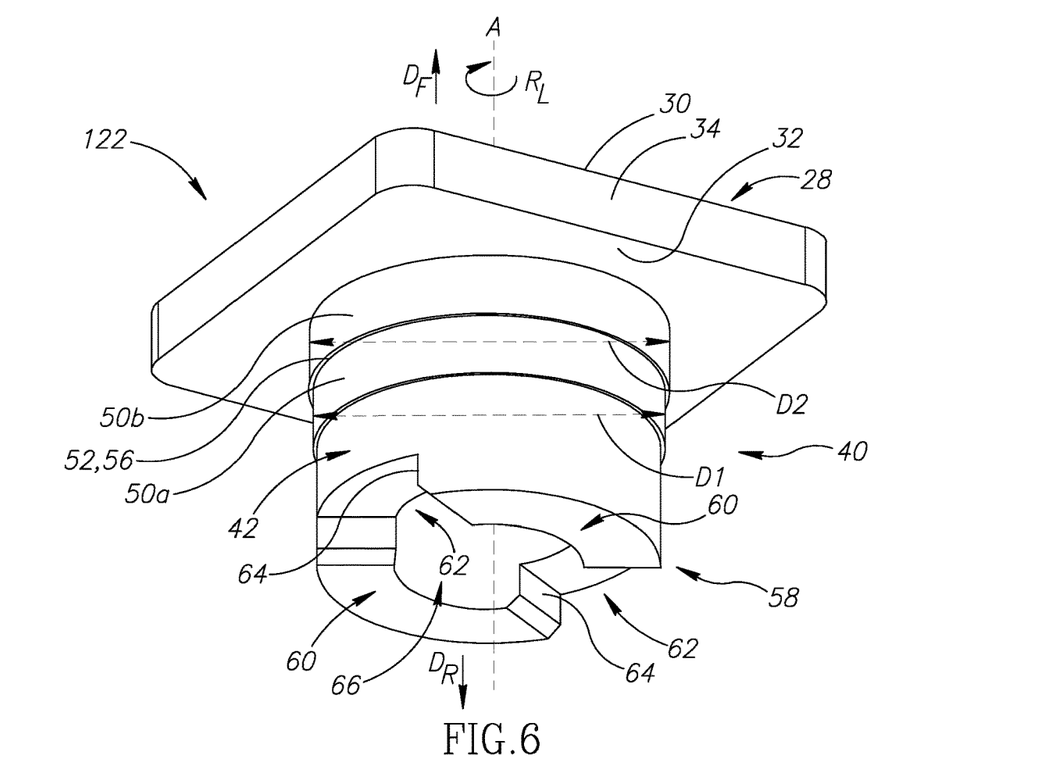
FIG. 6 is a perspective view the cutting tool key without the sleeve member attached, in accordance with a second embodiment of the present application.

In accordance with some embodiments of the subject matter of the present application, the locking member peripheral surface 42 can include an axial stop surface 52 that faces generally in the rearward direction $D_R$. The axial stop surface 52 serves to locate the sleeve member 46 in a predetermined position as described in detail further in the description. As shown in FIGS. 2 and 4, the axial stop surface 52 can be formed on an annular bulge portion 54 located at the locking member peripheral surface 42 adjacent the handle bottom surface 32. Alternatively, as shown in FIG. 6, the axial stop surface 52 can be formed by a cylinder shoulder portion 56 formed by the forwardly adjacent cylindrical surface 50a, 50b.

Reverting back to FIGS. 2 to 4, the locking member 40 includes a head receptacle portion 58 at a rear end thereof. The head receptacle portion 58 is designed to provide a housing for the cutting head 24 when the cutting head 24 is mounted in the cutting tool key 22, 122 (i.e. the cutting head 24 can be received into the head receptacle portion 58 and mated thereto) prior to releasable attachment to the tool holder 26. In accordance with some embodiments of the subject matter of the present application, the head receptacle portion 58 can include a plurality of circumferentially spaced apart torque transmission members 60 that define a plurality of circumferentially spaced apart receptacle gaps 62, where each receptacle gap 62 is located between a pair of adjacent torque transmission members 60. In this non-limiting example shown in the drawings, the head receptacle portion 58 includes exactly two torque transmission members 60, diametrically opposed to each other, and thus exactly two receptacle gaps 62, also diametrically opposed to each other. The number of receptacle gaps 62 corresponds to the number of cutting arms on the cutting head 24. As seen in FIG. 3, each torque transmission member 60 includes a torque transmission surface 64 for transmitting a locking torque to the cutting head 24 when the cutting tool key 22, 122 is rotated about the key central axis A in the rotational locking direction $R_L$. The torque transmission surface 64 can face generally in the rotational locking direction $R_L$.

As seen in FIGS. 3 and 4, in accordance with some embodiments of the subject matter of the present application, the cutting tool key 22, 122 can include an extraction through hole 66 that extends between, and opens out to, the handle top surface 30 and the head receptacle portion 58. The purpose of the extraction though hole 66 is to permit the cutting head 24 to be extracted from the cutting tool key 22, 122 by use of an extraction member (not shown), such as a rod, that applies an extraction force in the rearward direction $D_R$ upon the cutting head 24, thus urging it out of the head receptacle portion 58 and the sleeve member 46.

As seen in FIGS. 1 to 4, the cutting tool key 22, 122 includes a separate sleeve member 46. The sleeve member 46 includes two sleeve end surfaces 68 and a sleeve outer surface 70 that extends between the two sleeve end surfaces 68. The sleeve member 46 is hollow, having a sleeve through cavity 72 that extends between, and opens out to, the two sleeve end surfaces 68 at two sleeve openings 74, 76, a forward sleeve opening 74 and a rearward sleeve opening 76, thus defining a sleeve inner surface 78. The sleeve inner surface 78 peripherally delimits the sleeve through cavity 72. The sleeve width W of the sleeve member 46, that is the radial distance between the sleeve outer and inner surfaces 70,78, can be in the range 1.5 mm≤W≤2.5 mm. Preferably, the sleeve width W can have a value of 2 mm.

The sleeve member 46 is elastically flexible. In accordance with some embodiments of the subject matter of the present application, the sleeve member 46 can have a modulus of elasticity E in the range 0.001 GPa≤E≤0.05 GPa. Importantly, the sleeve member 46 must be rigid enough to elastically clamp the cutting head 24 to the cutting tool key 22, 122, while still permitting a) the forward end of the tool holder 26 to be received into the sleeve member 46, and b) the cutting tool key 22, 122 to be withdrawn away from the rotary cutting tool 20 once the cutting head 24 is releasably attached the tool holder 26 (i.e. withdrawn without the cutting head 24 attached). The sleeve member 46 and the head receptacle portion 58 can be made from different materials. Preferably, the sleeve member 46 can be made of silicone.

In accordance with some embodiments of the subject matter of the present application, the sleeve member 46 can be transparent or translucent, which advantageously allows the cutting head 24 and tool holder 26 to be visible during assembly of the rotary cutting tool 20.

In accordance with some embodiments of the subject matter of the present application, when the sleeve member 46 is unflexed (for example, not attached to the locking member 40, the sleeve inner and outer surfaces 70, 78 extend circumferentially along a sleeve central axis S and lie on two imaginary cylindrical surfaces that are co-axial with the sleeve central axis S. Thus, the sleeve through cavity 72 can have a cylindrical shape, where the sleeve inner surface 78 defines a sleeve diameter DS. The two sleeve end surfaces 68 can be planar and perpendicular to the sleeve central axis S.

The sleeve member 46 is attached to the locking member 40. In accordance with some embodiments of the subject matter of the present application, the sleeve member 46 can be releasably attached to the locking member 40. Advantageously, if the sleeve member 46 is damaged, such as torn, this allows it to be replaced. To releasably attach the sleeve member 46 to the locking member 40, the locking member 40 is inserted into the sleeve through cavity 72 at the forward sleeve opening 74. The locking member 40 is then urged in an axial direction further into the sleeve through cavity 72. In the non-limiting example shown in the drawings, the sleeve member 46 can come into contact with the axial stop surface 52, thus preventing further insertion of the locking member 40 into the sleeve through cavity 72 and positioning the sleeve in a pre-determined position relative to the locking member 40. It should be noted that by virtue of the sleeve diameter DS being less than the radial dimension of the sleeve mounting portion 44, the sleeve member 46 elastically deforms radially outwardly, i.e., is flexed, and thus elastically clamps itself onto the locking member 40 at the sleeve mounting portion 44. The axial portion of the sleeve member 46 not attached to the sleeve mounting portion 44 substantially maintains the sleeve diameter DS.

When the sleeve member 46 is attached to the sleeve mounting portion 44, the sleeve member 46 circumferentially surrounds the head receptacle portion 58. In accordance with some embodiments of the subject matter of the present application, the sleeve central axis S can be co-incident with the key central axis A. The sleeve member 46 can extend beyond the head receptacle portion 58 in the rearward direction $D_R$. Thus, the sleeve inner surface 78 can include a guiding surface 80 extending from the rearward sleeve opening 76 towards the head receptacle portion 58.

Figure 7:
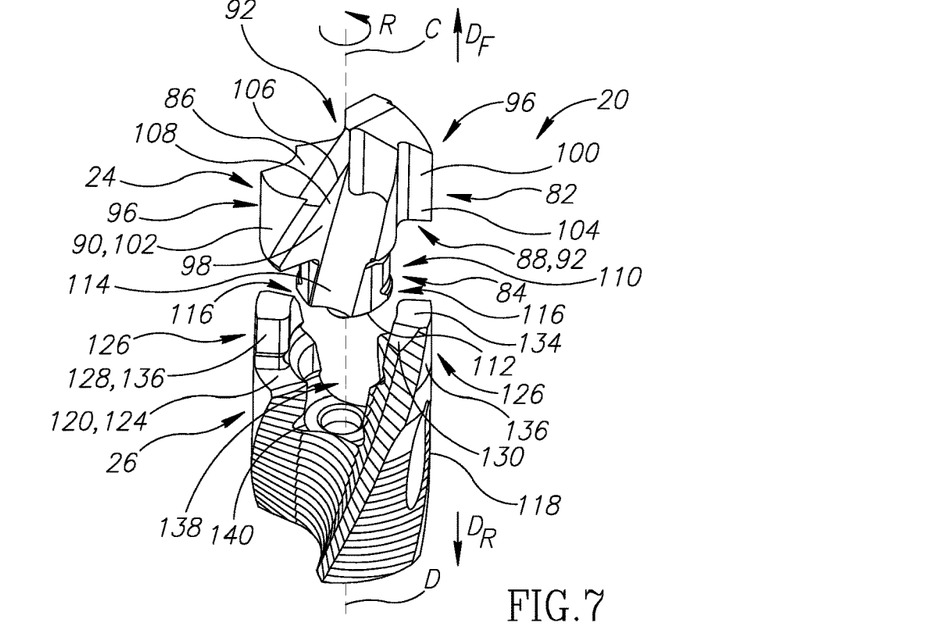
FIG. 7 is an exploded perspective view of the rotary cutting tool shown in FIG. 1.

The cutting head 24 and tool holder 26, though not part of the invention, are now discussed as a prelude to describing the assembly of the rotary cutting tool 20. Referring now to FIG. 7, the cutting head 24 is made from a unitary integral one-piece construction. The cutting head 24 has a head central axis C about which the cutting head 24 is rotatable in a rotational direction R. The rotational direction R is rotationally opposite to the rotational locking direction $R_L$. The head central axis C can be a longitudinal axis. The head central axis C extends in the forward to rearward directions $D_F$, $D_R$. The cutting head 24 includes a forward end that forms a cutting portion 82 and a rearward end that forms a head coupling portion 84.

The cutting portion 82 includes opposing head front and rear surface 86, 88 and a head peripheral surface 90 that extends between the head front and rear surfaces 86, 88. The head central axis C extends through the head front and rear surface 86, 88. The head rear surface 88 defines a boundary between the cutting portion 82 and the head coupling portion 84. The cutting portion 82 includes a head rear abutment surface 92 that faces generally in the rearward direction $D_R$, for abutting a complementary surface on the tool holder 26. The head rear abutment surface 92 is located on the head rear surface 88. The head rear surface 88 can be planar and perpendicular to the head central axis C.

The cutting portion 82 includes a head radially central portion 94. The cutting portion 82 includes a plurality of cutting arms 96 that extend radially outwards, with respect to the head central axis C, from the head radially central portion 94. In this non-limiting example shown in the drawings, the cutting portion 82 includes exactly two cutting arms 96, diametrically opposed to each other. Each cutting arm 96 respectively includes opposing arm rotationally leading and trailing surfaces 98, 100 and an arm peripheral surface 102 that extends peripherally between the arm rotationally leading and trailing surfaces 98, 100. The arm rotationally leading and trailing surfaces 98, 100 and the arm peripheral surface 102 are all located on the head peripheral surface 90. It should be understood that use of the terms "rotationally leading" and "rotationally trailing" throughout the description and claims refer to a position relative to the rotational direction R. The arm peripheral surfaces 102 can define a cutting head diameter DH. Each cutting arm 96 includes a driven surface 104 for driven engagement by a complementary surface on the tool holder 26. The driven surfaces 104 can be located on the the arm rotationally trailing surfaces 100. Advantageously this allows for effective torque transfer to the cutting head via the driven surfaces 104. The driven surfaces 104 can be spaced apart from the head rear surface 88. Preferably, the driven surfaces 104 can be located axially forward of the the head rear surface 88.

Each cutting arm 96 includes a respective major cutting edge 104. Each arm rotationally leading surface 98 includes a respective major rake surface 108. Each major rake surface 108 extends from the major cutting edge 104 to which it is associated towards the head rear surface 88. Key grip surfaces can be formed in the vicinity of the major rake surface 108 located on each cutting arm 96.

The head coupling portion 84 includes a head coupling pin 110 that protrudes rearwardly from the head rear surface 88 along the head central axis C. The purpose of the head coupling pin 110 is to provide a coupling means with the tool holder 26. The head coupling pin 110 includes a pin rear surface 112 that is spaced apart from the head rear surface 88 and a pin peripheral surface 114 that extends between the pin rear surface 112 and the head rear surface 88. The cutting head 24 can include at least one head latch 116. In the non-limiting example shown in the drawings, the at least one head latch 116 is located on the head coupling pin 110 and protrudes radially outwardly therefrom. Each head latch 116 can be adjacent the pin rear surface 112. The purpose of the head latch 116 is described further in the description.

The tool holder 26 has a holder longitudinal axis D that extends in the forward to rearward direction $D_F$, $D_R$ and about which the tool holder 26 is rotatable in the rotational direction R. The tool holder 26 includes a holder peripheral surface 118 that extends circumferentially along the holder longitudinal axis D. The holder peripheral surface 118 forms a boundary of a holder base surface 120 at a forward end of the tool holder 26. The holder longitudinal axis D extends through the holder base surface 120. The tool holder 26 includes a holder base abutment surface 124 that faces generally in the forward direction $D_F$, for abutting a complementary surface on the cutting head 24. The holder base abutment surface 124 is located on the holder base surface 120. In accordance with some embodiments of the subject matter of the present application, the holder base surface 120 can be planar and perpendicular to the holder longitudinal axis D.

The tool holder 26 includes a plurality of circumferentially spaced apart driving members 126 that extend forwardly from the holder base surface 120. The driving members 126 serve to impart a cutting torque $T_C$ to the cutting head 24 when the tool holder 26 rotates. In this non-limiting example shown in the drawings, the tool holder 26 includes exactly two driving members 126, diametrically opposed to each other. Each driving member 126 includes opposing driving member rotationally leading and trailing surfaces 128, 130 and a driving member peripheral surface 132 that extends peripherally between the driving member rotationally leading and trailing surfaces 128, 130. In accordance with some embodiments of the subject matter of the present application, each driving member 126 can include a respective driving member front surface 134 that axially delimits the driving member 126 in the forward direction $D_F$.

The driving member rotationally leading surface 128 includes a driving surface 136 for driven engagement with a respective complementary surface on the cutting head 24. In accordance with some embodiments of the subject matter of the present application, the driving surfaces 136 can be located axially forward of the holder base surface 120.

The tool holder 26 includes a holder coupling hole 138, for receipt of the head coupling pin 110 of the cutting head 24. The holder coupling hole 138 is recessed in the holder base surface 120 and extends along the holder longitudinal axis D in the rearward direction $D_R$. The holder coupling hole 138 may not be circumferentially fully closed. The tool holder 26 can include at least one holder undercut 140. In the non-limiting example shown in the drawings, the at least one holder undercut 140 is located in the holder coupling hole 138 and is recessed radially outwardly. Each holder undercut 140 can be adjacent the holder base surface 120. The purpose of the holder undercut 140 is described further in the description.

Another aspect of the subject matter of the present application relates to a cutting head key assembly 142 that includes the cutting tool key 22, 122, as defined hereinabove, and the cutting head 24. The cutting head key assembly 142 is adjustable between an assembled and unassembled position. In the unassembled position, the cutting head 24 is unattached to the cutting tool key 22, 122. As seen in FIG. 2, in the assembled position of the cutting head key assembly 142, the cutting head 24 is mated to the head receptacle portion 58. In the mated position, each cutting arm 96 extends through a respective receptacle gap 62.

The cutting head diameter DH is greater than the sleeve diameter DS. Thus, the cutting head 24 is elastically clamped at the head receptacle portion 58 by the sleeve member 46. In effect, the cutting head 24 is attached to the cutting tool key 22, 122 by a flexible sleeve member 46 which is mounted on the cutting tool key 22, 122 and has a sleeve inner surface 78 in frictional engagement with the cutting head 24.

As seen in FIG. 3, in accordance with some embodiments of the subject matter of the present application, the handle top surface 30 of the cutting tool key 22, 122 can include a handle indicator groove 144 recessed therein. The handle indicator groove 144 can be straight and intersect the key central axis A. The handle indicator groove 144 is designed to give a visual indication with regard to the orientation of the cutting head 24 in order to help in the assembly of the rotary cutting tool 20.

As shown in FIG. 4, in accordance with some embodiments of the subject matter of the present application, the head coupling pin 110 can extend through and beyond the rearward sleeve opening 76 in a rearward direction $D_R$.

Another aspect of the subject matter of the present application relates to a method of releasably attaching the cutting head 24 belonging to an assembled cutting head key assembly 142, to the tool holder 26. That is to say, adjusting the rotary cutting tool 20 from a released position to a fastened position.

Figure 8A:
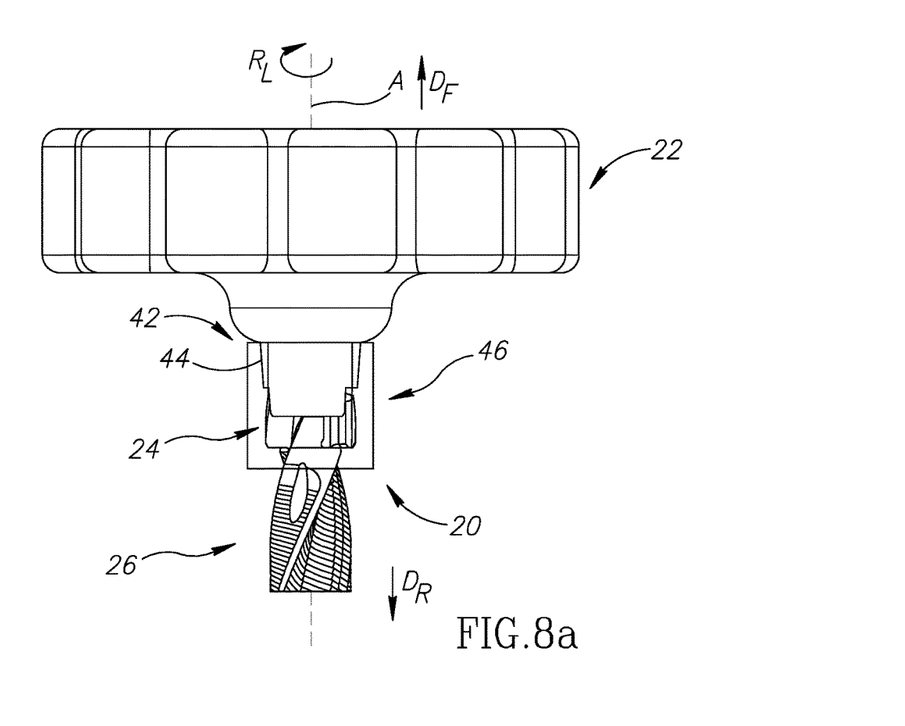
FIG. 8a is side view of the rotary cutting tool when the rotary cutting tool is in a pre-fastened position.
Figure 8B:
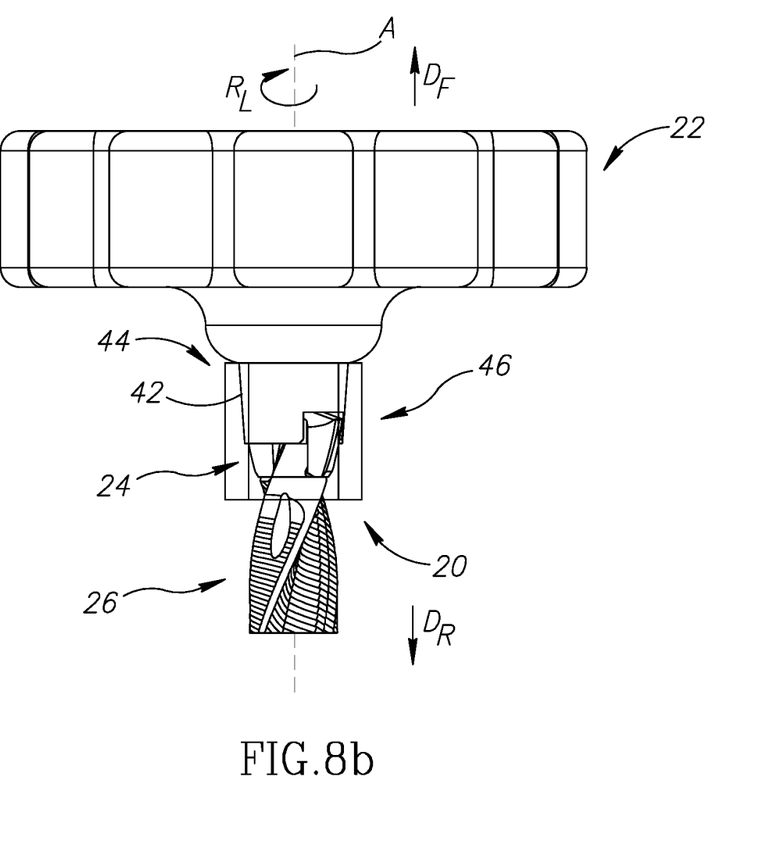
FIG. 8b is an analogous view shown in FIG. 8a, when the rotary cutting tool is in a fastened position.

The cutting head key assembly 142 is positioned relative to the tool holder 26 so that the cutting head 24 is adjacent the forward end of the tool holder 26 and each cutting arm 96 is angularly offset from a respective pair of adjacent driving members 126. The cutting head key assembly 142 is displaced towards the tool holder 26 until the cutting head 24 engages the tool holder 26, thus defining a pre-fastened portion (see FIG. 8a). Each cutting arm 96 is located angularly between the respective pair of adjacent driving members 126. The cutting tool key 22, 122 is then rotated in the rotational locking direction $R_L$ until the cutting head 24 is fastened to the tool holder 26. In the fastened position, resistive contact between the cutting arms 96 and the driving members 126 prevents further rotation of the cutting head key 22, 122 (see FIG. 8b). Each head latch 116 is located at a respective holder undercut 140. In this position the rotary cutting tool 20 is in a fastened position and the cutting head 24 is considered to be releasably attached to the tool holder 26. The cutting tool key 22, 122 is then withdrawn away from the rotary cutting tool 20 and the cutting head 24 separates from the cutting tool key 22, 122. It should be noted that the cutting head 24 remains attached to the tool holder 26 by virtue of each head latch 116 being held by a respective holder undercut 140.

In accordance with some embodiments of the subject matter of the present application, before positioning the cutting head key assembly 142 relative to the tool holder 26, the forward end of the tool holder 26 can be positioned at the rearward sleeve opening 76. The guiding surface 80 can be slid along the holder peripheral surface 118 in the rearward direction $D_R$. Advantageously, this aligns the head central axis C and the tool holder axis D. The head coupling pin 110 can be inserted into the holder coupling hole 138 before the guiding surface 80 slides along the holder peripheral surface 118 in the rearward direction $D_R$.

In such case, the cutting head 24 is releasably attached to the tool holder 26 by first positioning the cutting tool key 22, 122 with the attached cutting head 24 adjacent the forward end of the tool holder 26. Next, displacing the cutting tool key 22, 122 in a direction towards the tool holder 26 such that a portion of said forward end is received into the rearward sleeve opening 76 of the flexible sleeve member 46 and the cutting head 24 engages the forward end of the tool holder 26. Thereafter, rotating the cutting tool key 22, 122 until the cutting head 24 is fastened to the tool holder 26. Finally, displacing the cutting tool key 22, 122 in a direction away from the tool holder 26 until said portion of said forward end is no longer received into the rearward sleeve opening 76 of the flexible sleeve member 46.

It should be appreciated that the cutting tool key 22, 122 can also be used to disassemble the rotary cutting tool 20. During disassembly, the sleeve member 46 advantageously elastically clamps the cutting head 24 so that cutting head 24 moves with the cutting tool key 22, 122 when the cutting tool key 22, 122 is rotated in a direction opposite the rotational locking direction $R_L$.

It should be noted that a feature of subject matter of the present application is that the transparency or translucency of the sleeve member 46 allows the cutting head 24 to be visible when assembling the rotary cutting tool 20, and thus aids assembly of the rotary cutting tool 20.

It should also be noted that the another feature of subject matter of the present application is that the sleeve mounting portion 44 including the conical surface 48 or the plurality of cylindrical surfaces 50a, 50b allows sleeve members 46 of differing diameters to be attached to the sleeve mounting portion 44. This in turn allows rotary cutting heads 20 of different sizes to be elastically clamped to the same cutting tool key 22, 122.

What is claimed is:

1. A cutting tool key (22, 122), having a key central axis (A) about which the cutting tool key (22, 122) is rotatable in a rotational locking direction ($R_L$), the key central axis (A) extending in a forward ($D_F$) to rearward direction ($D_R$), the cutting tool key (22, 122) comprising:
    a handle component (28), for actuating rotation of the cutting tool key (22, 122) about the key central axis (A);
    a locking member (40) attached to the handle component (28) and extending therefrom in the rearward direction ($D_R$) along the key central axis (A), the locking member (40) comprising a head receptacle portion (58) at a rear end thereof, for receipt of a cutting head (24); and
    a sleeve member (46) releasably attached to the locking member (40); wherein
        the sleeve member (46) is elastically flexible and circumferentially surrounds the head receptacle portion (58).

2. The cutting tool key (22, 122) according to claim 1, wherein
    the sleeve member (46) comprises a sleeve through cavity (72), peripherally delimited by a sleeve inner surface (78), the sleeve through cavity (72) opening out at least to a rearward sleeve opening (76); and
    the sleeve inner surface (78) comprises a guiding surface (80) extending from the rearward sleeve opening (76) towards the head receptacle portion (58).

3. The cutting tool key (22, 122) according to claim 2, wherein the sleeve through cavity (72) has a cylindrical shape when the sleeve member (46) is unflexed.

4. The cutting tool key (22, 122) according to claim 1, wherein the sleeve member (46) is made of silicone.

5. The cutting tool key (22, 122) according to claim 1, wherein
the sleeve member (46) has a modulus of elasticity (E); and
the modulus of elasticity (E) is in the range 0.001 GPa≤E≤0.05 GPa.

6. The cutting tool key (22, 122) according to claim 1, wherein the sleeve member (46) is transparent or translucent.

7. The cutting tool key (22, 122) according to claim 1, wherein the locking member (40) is attached to the handle component (28) at a forward end of the locking member (40).

8. The cutting tool key (22, 122) according to claim 1, wherein the handle component (28) and the locking member (40) are integrally formed together and have unitary one-piece construction.

9. The cutting tool key (22, 122) according to claim 1, wherein
the locking member (40) comprises a circumferential locking member peripheral surface (42) extending along the key central axis (A) in the rear direction ($D_R$) from the handle component (28); and
the sleeve member (46) is attached at a sleeve mounting portion (44) located on the locking member peripheral surface (42).

10. The cutting tool key (22) according to claim 9, wherein
the sleeve mounting portion (44) comprises a conical surface (48) that tapers radially inwardly towards the key central axis (A) in the rearward direction ($D_R$).

11. The cutting tool key (122) according to claim 9, wherein
the sleeve mounting portion (44) comprises a first cylindrical surface (50a) having a first cylinder diameter (D1).

12. The cutting tool key (122) according to claim 11, wherein
the sleeve mounting portion (44) further comprises a second cylindrical surface (50b) having a second cylinder diameter (D2) and being located forward of the first cylindrical surface (50a); and
the second cylinder diameter (D2) is larger than the first cylinder diameter (D1).

13. The cutting tool key (22, 122) according to claim 9, wherein
the locking member peripheral surface (42) comprises an axial stop surface (52) that faces generally in the rearward direction ($D_R$); and
the sleeve member (46) is in contact with the axial stop surface (52).

14. The cutting tool key (22, 122) according to claim 1, wherein the handle component (28) exhibits N-fold rotational symmetry about the key central axis (A), where N is an integer.

15. The cutting tool key (22, 122) according to claim 1, wherein
the handle component (28) comprises a handle top surface (30), a handle bottom surface (32) and a handle peripheral surface (34) extending therebetween; and
the handle top surface (30) and the handle bottom surface (32) are planar and perpendicular to the key central axis (A).

16. The cutting tool key (22, 122) according to claim 15, wherein the locking member (40) projects in the rearward direction ($D_R$) from a radially central portion of the handle bottom surface (32).

17. The cutting tool key (22, 122) according to claim 15, wherein the cutting tool key (22, 122) further comprises an extraction through hole (66) extending between, and opening out to, the handle top surface (30) and head receptacle portion (58).

18. A cutting head key assembly (142) comprising:
a cutting head (24); and
a cutting tool key (22, 122) in accordance with claim 1; wherein
the cutting head key assembly (142) is adjustable between an assembled position and an unassembled position; and
in the assembled position, the cutting head (24) is mated to the head receptacle portion (58) and elastically clamped by the sleeve member (46).

19. The cutting head key assembly (142) according to claim 18, wherein
the sleeve member (46) comprises a sleeve through cavity (72), peripherally delimited by a sleeve inner surface (78), the sleeve through cavity (72) opening out at least to a rearward sleeve opening (76); and
the sleeve inner surface (78) comprises a guiding surface (80) extending from the rearward sleeve opening (76) towards the head receptacle portion (58).

20. The cutting head key assembly (142) according to claim 18, wherein
the cutting head (24) has a head central axis (C) extending in a forward ($D_F$) to rearward direction ($D_R$) and about which the cutting head (24) is rotatable in a rotational direction (R), the cutting head (24) comprising a plurality of cutting arms (96) extending radially outwards with respect to the head central axis (C), each cutting arm (96) comprising opposing arm rotationally leading and trailing surfaces (98, 100), and an arm peripheral surface (102) extending peripherally therebetween;
the arm peripheral surfaces (102) define a cutting head diameter (DH);
the sleeve member (46) comprises a sleeve through cavity (72) which opens out at least to a rearward sleeve opening (76), the sleeve through cavity (72) being peripherally delimited by a sleeve inner surface (78) and having a sleeve diameter (DS) when the sleeve is unflexed; and
in the unassembled position of the cutting head key assembly (142):
the cutting head (24) is unattached to the cutting tool key (22, 122); and
the cutting head diameter (DH) is greater than the sleeve diameter (DS).

21. The cutting head key assembly (142) according to claim 20, wherein
the sleeve inner surface (78) comprises a guiding surface (80) extending from the rearward sleeve opening (76) towards the head receptacle portion (58).

22. The cutting head key assembly (142) according to claim 21, wherein
the cutting head (24) comprises a head coupling portion (84) that includes a head coupling pin (110) protruding rearwardly from a head rear surface (88); and
in the assembled position, the head coupling pin (110) extends through and beyond the rearward sleeve opening (76) in the rearward direction ($D_R$).

23. A method of releasably attaching a cutting head (24) belonging to an assembled cutting head key assembly (142) in accordance with claim 18, to a tool holder (26) to define a fastened position of a rotary cutting tool (20); wherein:

the cutting head (24) has a head central axis (C) extending in a forward ($D_F$) to rearward direction ($D_R$) and about which the cutting head (24) is rotatable in a rotational direction (R), the cutting head (24) comprising a plurality of cutting arms (96) extending radially outwards with respect to the head central axis (C), each cutting arm (96) comprising a rotationally arm leading and trailing surfaces (98, 100), facing away from each other in opposite directions, and an arm peripheral surface (102) extending peripherally therebetween, and at least one head latch (116); and the tool holder (26) has a holder longitudinal axis (D), extending in the forward ($D_F$) to rearward direction ($D_R$) and about which the tool holder (26) is rotatable in the rotational direction (R), the tool holder (26) comprising:
- a holder peripheral surface (118) extending circumferentially along the holder longitudinal axis (D) and forming a boundary of a holder base surface (120) at a forward end of the tool holder (26);
- a plurality of circumferentially spaced apart driving members (126) extending forwardly from the holder base surface (120); and
- at least one holder undercut (140) for receipt of a respective head latch (116), to prevent axial separation of the cutting head (24) from the tool holder (26); wherein the method comprises the steps of:
- positioning the cutting head key assembly (142) relative to the tool holder (26) so that the cutting head (24) is adjacent the forward end of the tool holder (26) and each cutting arm (96) is angularly offset from a respective pair of adjacent driving members (126);
- displacing the cutting head key assembly (142) towards the tool holder (26) until the cutting head (24) engages the tool holder (26) and each cutting arm (96) is located angularly between the respective pair of adjacent driving members (126);
- rotating the cutting head key (22, 122) in the rotational locking direction ($R_L$) until resistive contact between the cutting arms (96) and the driving members (126) prevents further rotation of the cutting tool key (22, 122) and each head latch (116) is located at a respective holder undercut (140); and
- withdrawing the cutting tool key (22, 122) away from the rotary cutting tool (20).

24. The method, according to claim 23; wherein
the sleeve member (46) comprises a sleeve through cavity (72), peripherally delimited by a sleeve inner surface (78), the sleeve through cavity (72) opening out at least to a rearward sleeve opening (76); and
the sleeve inner surface (78) comprises a guiding surface (80) extending from the rearward sleeve opening (76) towards the head receptacle portion (58); and
the method further comprises, before the step of positioning the cutting head key assembly (142) relative to the tool holder (26), the steps of:
- positioning the forward end of the tool holder (26) at the rearward sleeve opening (76);
- sliding the guiding surface (80) along the holder peripheral surface (118) in the rearward direction ($D_R$).

25. The method, according to claim 24; wherein
the tool holder (26) comprises a holder coupling hole (138) recessed in the holder base surface (120) and extending along the holder longitudinal axis (D) in the rearward direction ($D_R$);
the cutting head (24) comprises a head coupling portion (84) that includes a head coupling pin (110) protruding rearwardly from a head rear surface (88); and
the method further comprises the step of:
- inserting the head coupling pin (110) into the holder coupling hole (138) before the guiding surface (80) slides along the holder peripheral surface (118) in the rearward direction ($D_R$).

26. A cutting tool key (22, 122), having a key central axis (A) about which the cutting tool key (22, 122) is rotatable in a rotational locking direction ($R_L$), the key central axis (A) extending in a forward ($D_F$) to rearward direction ($D_R$), the cutting tool key (22, 122) comprising:
- a handle component (28), for actuating rotation of the cutting tool key (22, 122) about the key central axis (A);
- a locking member (40) attached to the handle component (28) and extending therefrom in the rearward direction ($D_R$) along the key central axis (A), the locking member (40) comprising a head receptacle portion (58) at a rear end thereof, for receipt of a cutting head (24); and
- a sleeve member (46) attached to the locking member (40); wherein
  the sleeve member (46) is elastically flexible and circumferentially surrounds the head receptacle portion (58); and
  the sleeve member (46) is transparent or translucent.

* * * * *